United States Patent [19]

Barnett et al.

[11] Patent Number: 4,812,510

[45] Date of Patent: Mar. 14, 1989

[54] SMALL PARTICLE SIZE LATEX BASED ON VINYL ACETATE POLYMERS

[75] Inventors: Gerald W. Barnett, Middleburg Heights; Tien T. Chen, Brunswick, both of Ohio

[73] Assignee: The Glidden Company, Cleveland, Ohio

[21] Appl. No.: 853,054

[22] Filed: Apr. 17, 1986

[51] Int. Cl.[4] ............................................. C08L 43/00
[52] U.S. Cl. ................................. 524/807; 524/814; 524/817; 526/287
[58] Field of Search ............ 524/817, 807, 814; 526/287

[56] References Cited

U.S. PATENT DOCUMENTS

| | | | |
|---|---|---|---|
| 2,300,920 | 11/1942 | Heuer | 526/287 |
| 3,306,871 | 2/1967 | Miller | 524/817 |
| 3,318,830 | 5/1967 | Condon | 524/817 |
| 3,320,199 | 5/1967 | Briezinski | 524/817 |
| 3,563,963 | 2/1971 | Beier et al. | 526/329 |
| 3,929,706 | 12/1975 | Schmidt et al. | 524/817 |
| 3,931,087 | 1/1976 | Baatz et al. | 524/814 |
| 3,933,716 | 1/1976 | Kuhlmann et al. | 524/814 |
| 4,051,093 | 9/1977 | Wendel et al. | 524/814 |
| 4,357,442 | 11/1982 | Shah | 524/745 |

FOREIGN PATENT DOCUMENTS

| | | | |
|---|---|---|---|
| 0008775 | 3/1980 | European Pat. Off. | 524/817 |
| 1178597 | 9/1964 | Fed. Rep. of Germany | 524/817 |
| 0103497 | 8/1979 | Japan | |
| 0103498 | 8/1979 | Japan | |
| 0129015 | 8/1983 | Japan | 524/817 |
| 0026003 | 2/1985 | Japan | 524/817 |
| 0886984 | 1/1962 | United Kingdom | 524/817 |
| 1117711 | 6/1968 | United Kingdom | 524/817 |
| 1307890 | 2/1973 | United Kingdom | |
| 1350282 | 4/1974 | United Kingdom | 524/817 |

*Primary Examiner*—Joseph L. Schofer
*Assistant Examiner*—J. M. Reddick
*Attorney, Agent, or Firm*—Thomas M. Schmitz

[57] ABSTRACT

Colloid-free vinyl acetate latexes having an average particle size between 400 Å to 700 Å at a concentration of 30 to 50% by weight have been prepared. The latexes comprise 60 to 100 weight parts of vinyl acetate monomer with about 40 to 0 weight parts of one or more ethylenically unsaturated comonomers such that the glass transition temperature of the polymers are between −10° and 40° C. The latexes are prepared by emulsion polymerization in aqueous medium, in the presence of 0.05 to 20 parts of an anionic surfactant, e.g., alpha-olefin surfactant, and 0.05 to 15 parts of an ionic comonomer, e.g., sodium 2-acrylamido-2-methylpropane sulfonate (Na-AMPS). The interior wall primer-sealer derived from these fine particle size vinyl acetate latexes showed excellent enamel hold-out properties and paint stability. The latexes may also be applied aas binders in the manufacture of other paints, adhesives, papers, and as textile sizes.

18 Claims, No Drawings

SMALL PARTICLE SIZE LATEX BASED ON VINYL ACETATE POLYMERS

This invention relates to small particle size vinyl acetate containing latexes and their preparation using anionic surfactants with ionic comonomers in an emulsion polymerization.

BACKGROUND OF THE INVENTION

Vinyl acetate latexes have been used widely as binders in the manufacture of paints, textiles, papers, pressure sensitive adhesives and the like. Such applications require latexes which possess certain properties, such as film clarity, film integrity, high gloss, good adhesion, etc.

Some monomers or combinations of monomers are known to frequently produce latexes in a certain particle size range, e.g., acrylic latexes are usually small to medium size (<4000 Å) and vinyl acetate containing latexes are usually large (>4000 Å).

The free radical catalyzed polymerization of vinyl acetate copolymers in an emulsion, usually requires a so-called protective colloid (polyvinyl alcohol, hydroxyethyl cellulose (HEC), polyacrylic acids, etc.) to stabilize the latexes. There are several disadvantages to such systems:

The presence of HEC in a vinyl acetate latex during polymerization, increases the viscosity both during polymerization and of the finished latex. High viscosity during polymerization can cause poor agitation which produces poor mixing and heat transfer. High viscosity of the finished latex can make filtration and transfer from reactor to storage, etc., slow.

The high viscosity can be an even bigger problem when preparing and handling very small particle latexes of the type prepared in this patent. At a constant nonvolatile content, the latex viscosity increases as the particle size decreases. With HEC present, the viscosity can become unacceptably high at very small particle size.

Another disadvantage experienced when HEC is present, is batch-to-batch reproducibility. The HEC polymer is susceptible to oxidative cleavage by the persulfate used to initiate polymerization. Unfortunately the extent of degradation may vary considerably from batch to batch so the particle size can vary accordingly. Without the HEC present, as in our invention, the HEC degradation and related particle size effect are not of concern.

Due to the hydrophilic nature of these protective colloids, the particle size of vinyl acetate latexes stabilized by these colloids are very large (2000 to 10,000 Å) and also the latex films are very water-sensitive. Large particle size latexes suffer the properties of low gloss, poor film integrity, poor penetration power, and poor pigment binding capacity, etc. Therefore, the development of small particle size vinyl acetate latexes with particle size less than 1000 Å is highly desirable.

The preparation of ultrafine styrene-acrylic and all-acrylic latexes with particle size less than 1000 Å is not unusual, but for vinyl acetate latexes, it is very rare. In this invention, a novel process has been developed to prepare very stable, and clean vinyl acetate latexes having an average particle size below 1000 Å and preferably from 400 to 700 Å without protective colloids. Ionic comonomers, e.g., sodium vinyl sulfonate, have been used widely in preparing water-soluble polymers, dispersants and wetting agents, and ion-exchange resins. The dyeability of fibers and the stability of polymer latexes can be improved by incorporating ionic monomers. U.S. Pat. Nos. 3,318,830 and 3,320,199 (1967) disclosed the preparation of vinyl acetate latexes containing sodium vinyl sulfonate, with alkyl sulfate and polyalkylene glycol ether as surfactant. The mean particle size was between 1800 Å to 2200 Å. BP No. 1,307,890 (1970) disclosed a process for the manufacture of vinyl ester polymer dispersions with particle size of 300 to 2000 Å. The monomer also contained a small amount of acrylic acid, acrylamide, and sodium vinyl sulfonate (<1%). The surfactant systems contained both anionic surfactants, e.g., sodium lauryl sulfate and nonionic surfactant, e.g., nonylphenol polyglycol ether (23 EO units). Sodium vinyl sulfonate was added all in the beginning, while acrylic acid and acrylamide were metered in with the monomer mixture.

In JK No. 79,103,497 and No. 79,103,498 (1979), superfine acrylic and vinyl acetate latexes were prepared by emulsion polymerization in the presence of anionic surfactant (sodium lauryl sulfate), redox catalyst (persulfate-thiosulfate), Cu (II) as accelerator, and thickening preventive (ammonium hydroxide). In U.S. Pat. No. 4,193,902 (1980), a process for making fine particle size styrene-acrylic latexes having particle size of 100 to 600 Å was disclosed. Amides of unsaturated carboxylic acids, especially acrylamide or methacrylamide, promote the formation of finely distributed dispersions, when they are added to the batch during the polymerization simultaneously with the other monomers. Other related patents include U.S. Pat. No. 4,089,999 (1978); GP No. 2,556,327 (1977); BP No. 1,114,133 (1968); U.S. Pat. No. 3,740,367 (1968); Ger. Offen. DE No. 3,402,447 (1985); U.S. Pat. No. 3,965,032; Ger. Offen. No. 2,540,468 (1977); Ger. Offen. No. 2,309,368 (1974); U.S. Pat. No. 3,306,871 (1967).

It is known to use 2-acrylamido-2-methylpropane sulfonic acid, sodium salt (AMPS) as a major monomer component in preparing water-soluble polymers. U.S. Pat. No. 4,544,719 teaches such polymers formed from acrylamide and N,N-diallylacetamide. U.S. Pat. No. 4,544,722 teaches terpolymers formed from N-vinylpyrrolidone and acrylonitrile. (See also U.S. Pat. No. 4,502,965; 4,502,966; 4,451,631; 3,336,269; 4,451,631.)

DETAILED DESCRIPTION OF THE INVENTION

The invention relates to new small particle size aqueous vinyl acetate latex and process for preparing clean and stable vinyl acetate latex useful for coating purposes. The improve latexes having a particle size of below 1000 Å and preferably from about 400 Å to 700 Å are prepared by emulsion polymerizing in an aqueous medium from about 60 to 100 weight parts, preferably 65 to 95 parts, vinyl acetate monomer with from about 40 to 0 weight parts, preferably 35 to 5 parts; of one or more ethylenically unsaturated comonomers having ethylenic unsaturation adapted to copolymerize with said vinyl acetate.

Heretofore such polymerizations produced latex having an average particle size of about 2000 Å or larger. It has now been found that by conducting the aqueous emulsion polymerization in the presence of (a) 0.05 to 20 parts of an anionic surfactant and (b) 0.05 to 15 parts of an ionic comonomer, the particle size of the latex can be modified to yield small particle size latex having an average particle size in the range of about 400 Å to about 1000 Å and preferably from about 400 Å to about 700 Å.

The concepts of the present invention are applicable to the emulsion polymerization of vinyl acetate alone or polymers comprising a major amount of vinyl acetate with a minor amount of a wide variety of polymerizable monomers capable of copolymerizing through ethylenic addition polymerization conducted in an aqueous environment, hereinafter generally referred to as emulsion polymerization. Suitable formulations for polymerization in water comprise from about 60 to 100 weight parts vinyl acetate monomer with about 40 to 0 weight parts of one or more ethylenically unsaturated comonomers selected from the group consisting of acrylates, methacrylates, maleates, itaconates, fumarates, aliphatic and aromatic olefins, vinyl chloride, vinyl versatates, acrylonitrile polyether monomers, and vinylidene chloride. A most preferred copolymer is one having 70 to 90 parts vinyl acetate and 30 to 10 parts butyl acrylate. For some applications mixtures of one or more acrylates or methacrylates are useful.

A crosslinking monomer and/or transfer agent may be added to the monomer or the mixture of monomers.

By anionic surfactant is meant a surface active molecule composed of a hydrophobic end (aliphatic, aromatic or a combination of the two) and a hydrophilic end (carboxyl, sulfonate, sulfate, etc.). The latter has a cation (counterion), e.g., Na+, K+, NH$_4$+ associated with it and the molecule reduces surface tension when added to water or water solutions. The term "anionic" means that the part of the molecule adsorbed on the surface of the latex particle is an anion (negative charge) and imparts a negative charge to the particle.

Useful anionic surfactants include, alpha-olefin sulfonates with 11 to 16 carbon atoms, sulfated nonylphenol poly(ethyleneoxy)ethanol with 5 to 40 ethylene oxide units, complex organic phosphate ester-free acid with 5 to 40 ethylene oxide units, sulfated alkyl ether with 10 to 16 carbon atoms and 5 to 40 ethylene oxide units. Other useful surfactants include alkyl benzene sulfonate, alkyl diphenyloxide disulfonate, alkyl sulfate and sulfonate, and dialkyl sulfosuccinate. The most preferred surfactant is an alpha-olefin sulfonate having a structure:

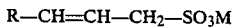

$$R-CH=CH-CH_2-SO_3M$$

wherein R is an alkyl group with 11 to 13 carbon atoms; and M is a cation selected from the group sodium, potassium, ammonium, and amines. The most preferred surfactant is the sodium salt.

Ionic comonomers are an ethylenically unsaturated compound, containing an ionizable acid functionality, that is capable of undergoing addition polymerization.

Useful ionic comonomers include sodium acrylamido-2-methylpropane sulfonate (Na-AMPS), sodium vinyl sulfonate, sodium sulfoethylmethacrylate, sodium styrene sulfonate, sodium 1-allyloxy 2-hydroxy propane sulfonate (Cop-1), sodium alkyl allyl sulfosuccinate (TREM LF-40*), mono- and diphosphated 2-hydroxyethyl methacrylate**, and the like. Sodium acrylamide-2-methyl propane sulfonate is the most preferred, especially when used with the preferred surfactant sodium alpha-olefin sulfonate.

*Diamond Shamrock Chemical
**PM-1 and PM-2-Aceto Chemical Company

The ionic comonomers must be metered in continuously and simultaneously with the monomer mixture. This is critical in order to prepare vinyl acetate latex having a particle size below 700 Å. If all ionic monomers are charged to the reaction flask prior to the polymerization, the final particle size of the latex will be much larger as shown in the comparison examples. Ionic comonomers not only can replace conventional surfactants and reduce the particle size of vinyl acetate latex, but also improve the mechanical stability of vinyl acetate latex.

The polymerization catalyst may be selected from conventional water-soluble free radical-forming agents, such as, alkali metal persulfate, ammonium persulfate, hydrogen peroxide, tert-butyl hydroperoxide, water-soluble diazo derivatives, or redox systems based on oxidizing agents such as hydrogen peroxide, organic peroxides or hydroperoxides, and reducing agents, such as alkali metal sulfites and bisulfites, amines, hydrazine and metal formaldehydesulfoxylates. The initiators can be used in the amount of 0.05 to 4, but preferably, 0.1 to 1 weight parts based on total monomers.

For preparing fine particle size vinyl acetate latex, the polymerization is conducted in an aqueous medium, in the presence of one or more anionic surfactants, present in an amount of up to 20 weight parts based on total monomer, preferably 1 to 5 weight parts, and in the presence of up to 15 weight parts of an ionic comonomer, preferably 0.5 to 5 weight parts. The use of excess surfactant, beyond the preferable range, does not necessarily reduce the particle size. Besides, the latex film will become extremely water sensitive. The use of excess ionic comonomers, beyond the preferable range, will cause an increase in latex viscosity and particle size. As seen from the examples, the combination of the proper surfactant and ionic comonomer, along with the correct feeding procedures of ionic comonomers, are most critical to this invention for producing very stable vinyl acetate latex having a particle size below 700 Å. Advantageously, it is not necessary to add a protective colloid to the emulsifiers. The latex of the instant invention is distinguished over the prior art latex which typically has an average particle size between 2000 to 10,000 Å.

The latex of the instant invention is useful in formulating a variety of adhesives and aqueous coatings. Typical formulations include interior primers, interior flats, interior semi-gloss, exterior paints, wood coatings, and metal coatings. These small particle latexes can be formulated into a variety of interior and exterior paints which do not require any special handling or formulation beyond that which is common knowledge to someone familiar with paint formulation. The test methods used for testing paints formulated with the latexes of this invention are those commonly used by anyone familiar with paint formulation and testing.

Applicant's product latexes differ appreciably from prior art VA/BA latexes, both with respect to average particle size and with respect to stability and cleanliness. A stable latex is a latex that when fully formulated will not gel or destabilize at ambient temperatures for a minimum holding of one year. There are many types and ways of measuring latex stability. Some of the common types are shear, oven, pump, and resistance to coagulation when making paint.

The shear stability can be judged during and immediately after the latex has been prepared. By observing the grit (small particles of solid polymer) in the flask or reactor during polymerization, an indication of latex cleanliness can be obtained. The more accurate measure is to filter the final latex through a fine screen (100–200 mesh) and then wash, collect, dry, and weight the grit. The weight is expressed either as grams per unit of latex volume (quart or gallon) or in parts per million (PPM).

Another test of stability is the mechanical stability as measured with a Hamilton-Beach milkshake mixer or Waring Blender. After subjecting the latex to a standard period of shear in one of these appliances, the latex is filtered and the grit measured as above. Occasionally a very unstable latex will coagulate to produce a putty or shaving cream type material during the test.

Pump stability is determined to predict how the latex will pump and transfer through plant transfer lines from the reactor, to storage, to paint-making equipment. The pump stability test can involve either a small bench top pumping unit or larger pilot unit that circulates the latex from a reservoir through the pump and back into the reservoirl Stability may be determined either by rapid viscosity increase during the pump test or by filtering the pumped latex to determine grit content.

The next type of stability, or instability, occurs when the latex is added to the paint pigment grind. This instability may be seen as soon as the latex is added, a semi-solid mass forms, or the paint may turn solid over a period of hours or days. Gradual destabilization is detected by regular viscosity measurement.

Oven stability can be determined for either the latex or the paint. The test involves storing small containers (half pint or pint cans) of the latex or paint in a 120° F. oven. The pH and viscosity are measured regularly over a four- or eight-week period. Significant changes of the measured properties indicate an instability.

By cleanliness is meant the absence of the coagulum, mentioned in the discussion of latex stability, and the absence of larger fragments of polymer that are produced when a skin forms on the latex and is subsequently shredded by some tearing agitation action.

It is critical to the present invention to produce stable latexes having particle size of from about 400 Å to 1000 Å to use an anionic surfactant and to critically add the ionic comonomer simultaneously with the major polymerizable monomers. If all ionic monomers are charged to the reaction flask prior to the polymerization, the final particle size of the latex will be much larger.

The following illustrative examples should not be narrowly construed. Unless otherwise indicated parts and percentages are by weight and temperature is given in degrees Centigrade.

EXAMPLE 1

Preparation of Small Particle Size Vinyl Acetate Latexes

A small particle size vinyl acetate/butyl acrylate latex was prepared by emulsion polymerization in water using the following ingredients:

| Group | Reactants | Weights (g) |
| --- | --- | --- |
| A | Deionized Water | 2016 |
|  | Siponate A-246L[1] | 90 |
|  | NaHCO$_3$* | 5.4 |
| B | K$_2$S$_2$O$_8$** | 8.166 |
| C | Vinyl Acetate | 72 |
|  | Butyl Acrylate | 18 |
| D | Na—AMPS*** | 1.8 |
|  | Deionized Water | 1.8 |
| E | Vinyl Acetate | 1368 |
|  | Butyl Acrylate | 342 |
| F | Na—AMPS*** | 34.2 |

| Group | Reactants | Weights (g) |
| --- | --- | --- |
|  | Deionized Water | 180 |
| G | AWC-RICE[2] | 0.72 |
|  | Deionized Water | 4.8 |
| H | t-BHP-70**** | 0.72 |
|  | Deionized Water | 4.8 |

[1]Trade name of Alcolac Chemical Company
*Sodium Bicarbonate
**Potassium Persulfate
***Sodium acrylamido-2-Methylpropane Sulfonate
****tert-Butyl Hydroperoxide
[2]Sodium Formaldehyde Sulfoxylate. Hydrosulfite AWC is a product of Diamond Shamrock Company.

Procedure:
1. Load "A" to a 5-liter flask equipped with an agitator, reflux condenser, feed system for "E" and "F", and a nitrogen purge tube.
2. While heating to 78° C., purge with nitrogen.
3. When the temperature stabilizes at 78° C., add "B", wait one minute, and add "C" and "D".
4. When the monomer reflux stops (ca. 20 minutes), start metering "E" and "F" simultaneously over five hours. The polymerization temperature is kept at 78° to 80° C.
5. After the feeds are complete, hold 30 minutes, and then add ⅓ portions of "G" and ½ portions of "H" at 10-minute intervals.
6. Cool and filter.

Physical Properties:

| | | |
| --- | --- | --- |
| (a). | Non-Volatile | 44.2% |
| (b). | pH | 4.3 |
| (c). | Partical Size | 530 Å |
| (d). | Mechanical Stability | >30 minutes |
| (e). | Viscosity | 9050 cps (no. 3, 10 rpm) |
| (f). | % Coagulum | 0 |

EXAMPLES 2–3

The procedure of Example 1 was repeated using different ionic comonomers at the same active level (2.0 phm) in combination with Siponate A-246L as surfactant. Table I shows the physical properties of the vinyl acetate/butyl acrylate latexes made with these ionic comonomers.

TABLE I

| Example | Ionic Comonomers Type* | Ionic Comonomers Grams | Particle Size (Å) | Coagulum (g) | Non-Volatile (%) | Mechanical Stability (minutes) |
| --- | --- | --- | --- | --- | --- | --- |
| 2 | SEM | 18 | 580 | 0 | 42.6 | >30 |
| 3 | SVS | 72 | 600 | 0 | 44.1 | >30 |

*SEM = Sulfoethmethacrylate (Dow)
SVS = Sodium Vinyl Sulfonate (Air Products)

EXAMPLES 4–7

The procedure of Example 1 was repeated except that the amounts of Siponate A-246L and Na-AMPS were adjusted.

TABLE II

| Example | Siponate A-246L (g) | AMPS (g) | Particle Size (Å) | Non-Volatile (%) | Grit (g) | Mechanical Stability (minutes) |
| --- | --- | --- | --- | --- | --- | --- |
| 4 | 135 | 18 | 610 | 45.1 | 0 | >30 |
| 5 | 90 | 18 | 625 | 43.1 | 0 | >30 |
| 6 | 45 | 36 | 600 | 44.0 | Trace | >30 |

TABLE II-continued

| Example | Siponate A-246L (g) | AMPS (g) | Particle Size (Å) | Non-Volatile (%) | Grit (g) | Mechanical Stability (minutes) |
|---|---|---|---|---|---|---|
| 7 | 45 | 72 | 600 | 43.5 | Trace | >30 |

EXAMPLE 8

For obtaining small particle size latexes, it is important to feed NaAMPS simultaneously and continuously with monomer feed rather than adding all of it in the beginning. In comparison to Example 1, Example 8 shows the effect of a non-feed procedure, for Na-AMPS, on the physical properties of the latex. The final particle size increase is from 535 Å to 835 Å.

| Group | Ingredients | Weights (g) |
|---|---|---|
| A | Deionized Water | 2106 |
|  | Siponate A-246L | 90 |
|  | NaHCO$_3$ | 5.4 |
|  | Na—AMPS | 36 |
| B | K$_2$S$_2$O$_8$ | 8.166 |
| C | Vinyl Acetate | 72 |
|  | Butyl Acrylate | 18 |
| D | Vinyl Acetate | 1368 |
|  | Butyl Acrylate | 342 |
| E | AWC-RICE | 0.72 |
|  | Deionized Water | 4.8 |
| F | t-BHP-70 | 0.72 |
|  | Deionized Water | 4.8 |

Procedure:
1. Load "A" to a 5-liter flask equipped with an agitator, reflux condenser, feed system for "D", and a nitrogen purge tube.
2. While heating to 78° C., purge with nitrogen.
3. When the temperature stabilizes at 78° C., add "B", wait one minute, and add "C".
4. When the monomer reflux stops (ca. 20 minutes), start to meter "D" over five hours. The polymerization temperature is kept at 78° to 80° C.
5. Hold 30 minutes, add ⅓ portions of "E" and ½ portions of "F" at 10-minute intervals.

EXAMPLE 9

The experimental formulation was the same as Example 6 except that all Na-AMPS was added prior to the polymerization as described in Example 8. The final particle size increased from 600 Å to 980 Å.

EXAMPLES 10-11

The procedures of Example 1 and Example 6 were repeated without Na-AMPS.

| Example | Siponate A-246L (g) | Particle Size (Å) | Non-Volatile (%) | Grit (g) | Mechanical Stability (minutes) |
|---|---|---|---|---|---|
| 10 | 90 | 725 | 44.0 | 1.9 | 8 |
| 11 | 45 | 1125 | 43.6 | 0 | 5 |

This table clearly shows that Na-AMPS not only reduced the particle size, but also improved the mechanical stability of the vinyl acetate/butyl acrylate latex.

EXAMPLES 12-17

The procedures of Example 6 were repeated except that Na-AMPS was replaced by other ionic comonomers at the same active level (1.0 phm).

| Example | Ionic Comonomers Type* | Grams | Particle Size (Å) | Non-Volatile (%) | Grit (g) | Mechanical Stability (minutes) |
|---|---|---|---|---|---|---|
| 12 | SEM | 18 | 735 | 42.6 | 0.23 | 1.5 |
| 13 | SVS | 72 | 865 | 44.2 | 0 | 30 |
| 14 | COP-1 | 45 | 1090 | 43.7 | 0.03 | 3 |
| 15 | PM-1 | 18 | 870 | 45.8 | 0.07 | 3 |
| 16 | SSSo | 18 | 940 | 32.1 | 0.06 | 30 |
| 17 | TREM LF-40 | 45 | 845 | 44.0 | 0 | 30 |

*SEM = Sulfoethylmethacrylate (Dow Chemical)
SVS = Sodium Vinyl Sulfonate (Air Products)
COP-1 = Sodium 1-Allyloxy 2-Hydroxy Propane Sulfonate (Alcolac)
PM-1 = Phosphated Methacrylate (Aceto Chemical)
SSSo = Sodium Styrene Sulfonate (DuPont)
TREM LF-40 = Sodium Alkyl Allyl Sulfosuccinate (Diamond Shamrock)

This table clearly shows the superiority of Na-AMPS (Example 6) versus other ionic comonomers in reducing particle size and improving mechanical stability

EXAMPLES 18-26

The procedure of Example 5 wax repeated except that Siponate A-246L was replaced by other anionic surfactants at the same active level (2.0 phm).

| Example | Surfactants Type | Weight | Particle Size (Å) | Non-Volatile (%) | Grit (g) | Mechanical Stability (minutes) |
|---|---|---|---|---|---|---|
| 18 | Dowfax 2A-1[a] | 80 | 1180 | 44.6 | 0 | >30 |
| 19 | Aerosol 22[b] | 103 | 1065 | 44.9 | 0.09 | 1 |
| 20 | Abex 18S[c] | 103 | 905 | 44.2 | 0.82 | 1.5 |
| 21 | Alipal EP-110[d] | 120 | 725 | 44.3 | 0.03 | 3 |
| 22 | Siponate DS-10[e] | 36 | 1025 | 44.2 | 0.05 | >30 |
| 23 | SLS[f] | 36 | 1260 | 44.3 | 0.05 | >30 |
| 24 | Polystep B-19[e] | 138 | 845 | 44.4 | 0.39 | >30 |
| 25 | Alipal EP-120[d] | 120 | 740 | 44.3 | 0.71 | >30 |
| 26 | Gafac RS-710[d] | 36 | 810 | 44.3 | 0 | >30 |

This table clearly shows the superiority of Siponate A-246L (Example 5) versus other anionic surfactants in reducing particle size and improving mechanical stability.
[a]Tradename of Dow Chemical
[b]Tradename of American Cyanamid
[c]Tradename of Alcolac Chemical Company
[d]Tradename of GAF Corporation
[e]Tradename of Stepan Chemical Company
[f]Sodium Lauryl Sulfate

EXAMPLE 27

Paint Preparation with Small Particle Size Latexes
PVA Primer/Sealer

| Raw Materials | Pounds | Gallons |
|---|---|---|
| Water | 150.000 | 18.007 |
| Sift in | | |
| Hydroxyethyl Cellulose | 3.000 | 0.26 |
| Sodium Salt of Polycarboxylic Acid | 4.000 | 0.43 |
| Nonyl Phenoxy Poly(ethyleneoxy)Ethanol | 4.000 | .45 |
| Ethylene Glycol | 20.000 | 2.15 |
| Defoamer | 2.000 | .263 |
| Titanium Dioxide (rutile) | 100.000 | 2.99 |
| Calcium Carbonate | 150.000 | 6.64 |
| Magnesium Silicate | 50.000 | 2.18 |
| Disperse to 4.0–5.0 H grind | | |
| Mix well | | |
| Transfer to thindown tank | | |
| Thin with agitation | | |
| Water | 190.09 | 22.82 |
| Example 1. Latex | 260.100 | 29.23 |
| Coalescent | 13.00 | 1.64 |
| Premix net 3 items | | |
| Water | 100.000 | 12.00 |
| Hydroxyethyl Cellulose | 2.5 | 0.22 |
| Add premix | | |
| Mix for 30 minutes | | |
| Defoamer | 4.000 | 0.53 |
| Tinting Pigment | .900 | 7 |
| Agitate for one hour before testing. | | |
| Total yield | 1055.09 | 100.000 |

When this primer sealer was applied over drywall, the holdout appeared very uniform when the taped and non-taped areas were compared. Further evidence, of much greater surface uniformity, than that provided by the commercially available primer/sealers, was the appearance of the drywall after one coat of semi-gloss paint had been applied.

What is claimed is:

1. A paint coating composition containing a polymeric binder of a stable, clean, water dispersed vinyl acetate copolymer latex comprising on a polymeric solids weight basis:
   the vinyl acetate copolymer comprising copolymerized monomers of 60 to 100 weight parts vinyl acetate, 0.05 to 15 weight parts of an ionic comonomer selected from a sulfonate salt of an ethylenically unsaturated monomer or a phosphate salt of 2-hydroxyethyl methacrylate, and 0 to 40 weight parts of other ethylenically unsaturated monomer, where said monomers are copolymerized simultaneously by aqueous emulsion copolymerization in the presence of 0.05 to 20 weight parts of an alpha-olefin sulfonate salt anion surfactant having the structure:

$R-CH=CH-CH_2-SO_3 M$ 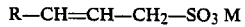

where R is an aliphatic carbon chain and M is selected from sodium, potassium or ammonium;
   said vinyl acetate copolymer having an average polymer particle size between about 400 A and 1000 A.
2. The coating composition of claim 1 where the ionic comonomer comprises an acrylamido alkyl sulfonic acid salt.
3. The coating composition of claim 1 where the ionic comonomer comprises a methacrylamido alkyl sulfonic acid salt.
4. The coating composition in claim 1 where the ionic comonomer comprises a sodium styrene sulfonate.
5. The composition in claim 4 where the ionic comonomer comprises sodium sulfoethyl methacrylate.
6. The coating composition in claim 1 where the ionic monomer comprises sodium vinyl sulfonate.
7. The coating composition in claim 1 where the ionic comonomer comprises a sodium alkyl allyl sulfosuccinate.
8. The coating composition in claim 1 where the phosphate ionic monomer of 2-hydroxyethyl methacrylate is a mono-phosphate salt.
9. The coating composition in claim 1 where the phosphate ionic monomer of 2-hydroxyethyl methacrylate is a di-phosphate salt.
10. The coating composition in claim 1 where the ionic monomer comprises sodium 1-allyloxy-2-hydroxy propane sulfonate.
11. The coating composition in claim 1 where the ionic monomer comprises sodium acrylamide-2-methyl propane sulfonate.
12. The coating composition of claim 1 where M in the anionic surfactant is sodium.
13. The coating composition of claim 1 where M in the anionic surfactant is potassium.
14. The coating composition in claim 1 where M in the anionic surfactant is ammonium.
15. The coating composition in claim 1 where the vinyl acetate copolymer has an average polymer particle size between about 400 and 700 Angstroms.
16. The coating composition in claim 1 where the vinyl acetate copolymer comprises between 60 and 95 weight parts of copolymerized vinyl acetate monomer and between 5 and 40 weight parts of copolymerized other ethylenically unsaturated monomer.
17. The coating composition in claim 16 where the vinyl acetate copolymer comprises between 60 and 95 weight parts of copolymerized vinyl acetate monomer and between 5 and 40 weight parts of copolymerized acrylic or methacrylic monomer.
18. The coating composition in claim 17 where the vinyl acetate copolymer comprises between 60 and 80 weight parts of copolymerized vinyl acetate monomer and between 20 and 40 weight parts of copolymerized butyl acrylate.

* * * * *